UNITED STATES PATENT OFFICE.

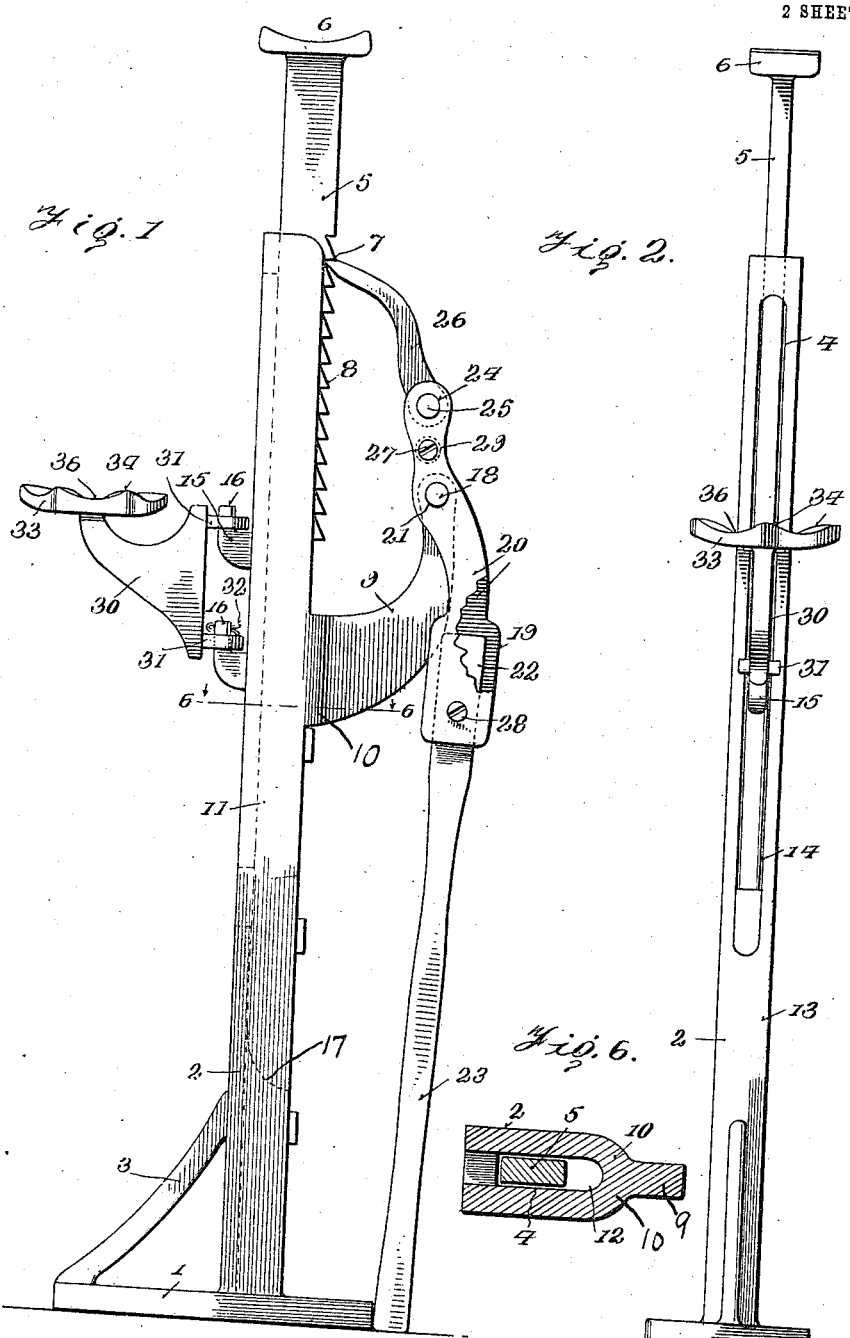

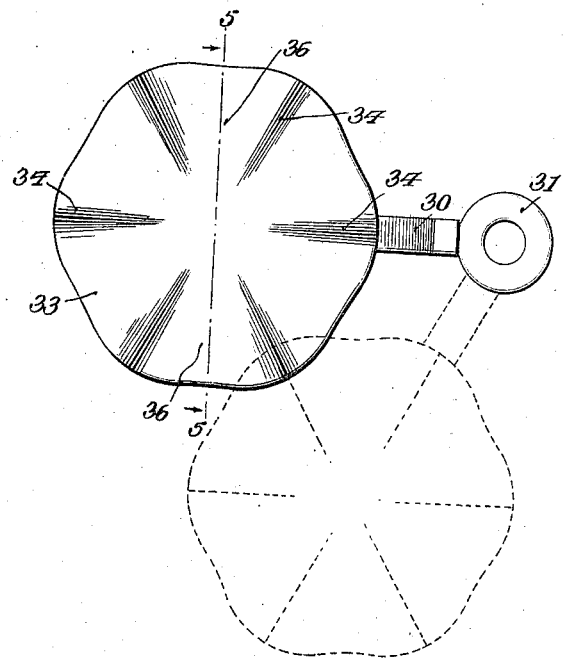
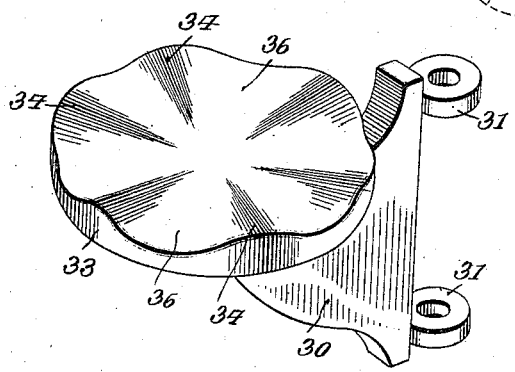
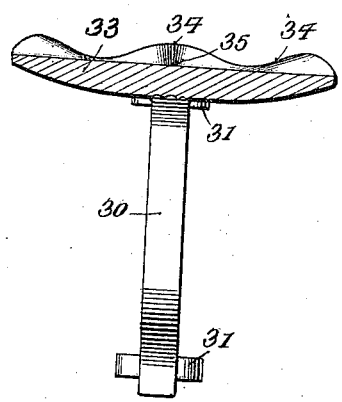

LE ROY WILLOUR, OF ASHLAND, OHIO, ASSIGNOR TO THE ASHLAND MANUFACTURING COMPANY, OF ASHLAND, OHIO, A CORPORATION OF OHIO.

TIRE-SAVER.

987,523.  Specification of Letters Patent.  Patented Mar. 21, 1911.

Application filed October 6, 1910. Serial No. 585,638.

*To all whom it may concern:*

Be it known that I, LE ROY WILLOUR, a citizen of the United States, residing at Ashland, in the county of Ashland and State of Ohio, have invented certain new and useful Improvements in Tire-Savers, of which the following is a specification.

My invention relates to lifting jacks commonly termed tire-savers, as four of such jacks may be conveniently employed to elevate and hold in such elevated position, an automobile or the like, when the same is not in use, whereby the tires are relieved from the pressure exerted by the weight of the automobile and hence saved a considerable amount of unnecessary wear.

An important object of this invention is to provide a device of the above character, formed of few and readily separable parts, whereby the device may be packed in a small space when not in use, and the individual parts replaced should they become broken or lost.

A further object of this invention is to provide in a jack of the above character, means for engaging the hub or axle of a vehicle, such means comprising a head having its engaging surface provided with recesses for receiving said hub or axle, whereby said hub or axle may be readily positioned within said recesses when said engaging means is disposed at different angles with relation to said hub or axle.

A further object of this invention is to provide a lifting jack so constructed that the lift-bar of the same may be raised to a desired position by a single oscillatory movement of an operating lever, and the said lift-bar automatically locked in such raised position.

Other objects and advantages of this invention will be apparent during the course of the following description.

In the accompanying drawings forming a part of this specification, and in which like numerals are employed to designate like parts throughout the same, Figure 1 is a side view of the tire-saver or jack, Fig. 2 is an end view of the same, Fig. 3 is a top plan view of the means for engaging the load, which means is connected with the lift-bar, Fig. 4 is a perspective view of the same, Fig. 5 is an end view of the same, the head thereof being shown in section, and Fig. 6 is a horizontal cross-sectional view taken on line 6—6 of Fig. 1 and looking downwardly.

In the drawings wherein is illustrated a preferred embodiment of my invention, the numeral 1 designates a suitable base upon which is formed an upright 2, as shown. This base and upright may preferably be connected by a diagonally disposed section of material 3. The upright 2 is provided with an axial opening 4 extending through the end wall of said upright. Within this axial opening is longitudinally movably mounted a lift-bar 5, provided upon its upper end with a head 6, as shown. The lift-bar 5 is provided upon one end wall thereof with ratchet-teeth 8, which are disposed outwardly of said upright 2, as clearly shown in Fig. 1. Disposed substantially midway the ends of the upright 2, is a curved supporting bracket 9, the inner lower end of which is forked, as shown at 10. The portions 10 are formed upon the side walls 11 and are preferably cast integral therewith. By having the inner end of the supporting bracket 9 forked, as shown, a space 12 is provided to permit the ratchet-teeth 8 passing the supporting bracket 9. The opposite end wall 13 is provided with a longitudinally disposed slot 14 formed therethrough, for receiving spaced superposed brackets 15, which are secured to the lift-bar 5 and preferably cast integral therewith. These brackets 15 comprise vertical cylindrical portions 16, as shown. The lower end of the lift-bar 5 may preferably be rounded as shown at 17, to clear the lower end wall of the slot 14, when the lift-bar 5 is being removed from the upright 2.

The upper end of the supporting bracket 9 is suitably spaced from the upright 2, as shown, and carries a transverse pin 18 rigidly connected therewith. An operating lever 19 is pivotally mounted upon this supporting bracket, said operating lever comprising a body portion formed of a pair of like castings 20, which are disposed upon opposite sides of the supporting bracket 9 and provided near the upper ends thereof with openings 21 for receiving the ends of the pin 18. At their lower ends the castings 20 are provided with oppositely disposed recesses 22 coöperating to form a socket for receiving the upper end of a handle 23. The corresponding upper ends of the castings 20 are provided with openings 24, for receiving a pin 25 fixedly mounted upon a swinging pawl 26, which is disposed between the pairs of castings 20 and adapted to engage the ratchet-teeth 8, as shown. The pair of castings 20 are detachably connected, by means of screws 27 and 28, or the like. The screw 28 engages the handle 23 and rigidly clamps the lower ends of the castings 20 against the same. The screw 27 connects the upper ends of the castings 20, which are retained in their proper spaced relation by means of a washer 29 or the like, surrounding said screw 27. From the description of the above referred to parts, it is obvious that the castings 20 may be disconnected from each other and removed from the bracket 9, and the pawl 26 and handle 23 removed from the castings 20.

Means for engaging the load to be lifted is provided, including a body-bracket or laterally extending arm 30, having apertured ears 31 formed upon the end wall thereof and adjacent the upper and lower ends of the same. These apertured ears are pivotally mounted upon the cylindrical portions 16 of the brackets 15. The lower bracket 15 is provided with a cotter-pin 32, for preventing the accidental removal of the apertured ears 31 from said brackets 15. By the construction of the above referred to parts, it is obvious that the body-bracket or laterally extending arm 30 is pivotally connected with the lift-bar 5, to oscillate in a horizontal plane, and may be detached from the same when desired. Upon the outer end of the body-bracket 30 is rigidly mounted a preferably approximately cylindrical head 33, which may preferably be cast integral with the body-bracket 30. Upon the upper surface of the head 33 are formed diametrically disposed pairs of ridges 34, which are curved in vertical cross-section, as shown. Each of the ridges 34 increases in height toward the periphery of the head 33. The ridges 34 terminate at points spaced from the center of the head 33, so that a section taken diametrically through said head, as on line 5—5 of Fig. 3, will show the upper surface as being flat or disposed in the same plane, as shown at 35 in Fig. 5. The function of the ridges 34 is to form pairs of diametrically disposed recesses 36 therebetween, which receive the hub or axle of a vehicle. The ridges 34 prevent the hub or axle from slipping off of the head 33 and owing to the number and arrangement of these ridges, it is obvious that said hub or axle may be readily disposed between a pair of the same when the body-bracket or laterally extending arm 30 is arranged at different angles to said hub or axle.

In the use of the tire-saver or jack, the same is suitably positioned with relation to the hub or axle of a vehicle. The lift-bar 5 is then raised so that the head 33 may engage the hub or axle, the body-bracket or laterally extending arm 30 being oscillated so that the hub or axle will fit within a selected pair of the recesses 36. The operating lever is then oscillated upwardly and the pawl 26 placed in engagement with the teeth 8. Upon the downward oscillation of the operating lever, the lift-bar will be elevated, and automatically locked in its elevated position, by virtue of the position assumed by said operating lever.

I wish it understood that the form of my invention herewith shown and described, is to be taken as a preferred example of the same, and that certain changes in the shape, size and arrangement of parts may be resorted to without departing from the spirit of my invention or the scope of the subjoined claims.

Having thus fully described my invention, what I claim as new and desire to secure by Letters Patent, is:—

1. In a device of the character described, an upright, a lift-bar having slidable engagement therewith, means to effect a longitudinal movement of the lift-bar, load engaging means connected with the lift-bar intermediate the ends thereof, including a laterally extending bracket having pivotal connection with said lift-bar, and a head rigidly connected with said bracket, said head having its engaging surface provided with radially disposed recesses.

2. In a device of the character described, an upright, a lift-bar having slidable engagement therewith, an operating lever to effect the longitudinal movement of the lift-bar, load engaging means connected with the lift-bar intermediate the ends thereof, including a laterally extending member pivotally and detachably connected with the lift-bar, and a head rigidly connected with said member, said head having its engaging surface provided with radially disposed recesses.

3. In a device of the character described, an upright, a lift-bar having slidable engagement therewith, brackets connected with said lift-bar, a body-bracket provided with apertured ears for detachable pivotal connection with said brackets, and a head having rigid engagement with said body-bracket, said head having its engaging surface provided with a plurality of pairs of diametrically arranged ridges.

4. In a device of the character described, an upright, a lift-bar having slidable engagement therewith, an engaging head having one side thereof provided with pairs of diametrically disposed ridges, curved and increasing in cross-section outwardly, and means rigidly connected with said head and having pivotal connection with said lift-bar.

In testimony whereof I affix my signature in presence of two witnesses.

LE ROY WILLOUR.

Witnesses:
J. B. DANCER,
F. J. MOHREMAN.

Copies of this patent may be obtained for five cents each, by addressing the "Commissioner of Patents, Washington, D. C."